Figure 1:
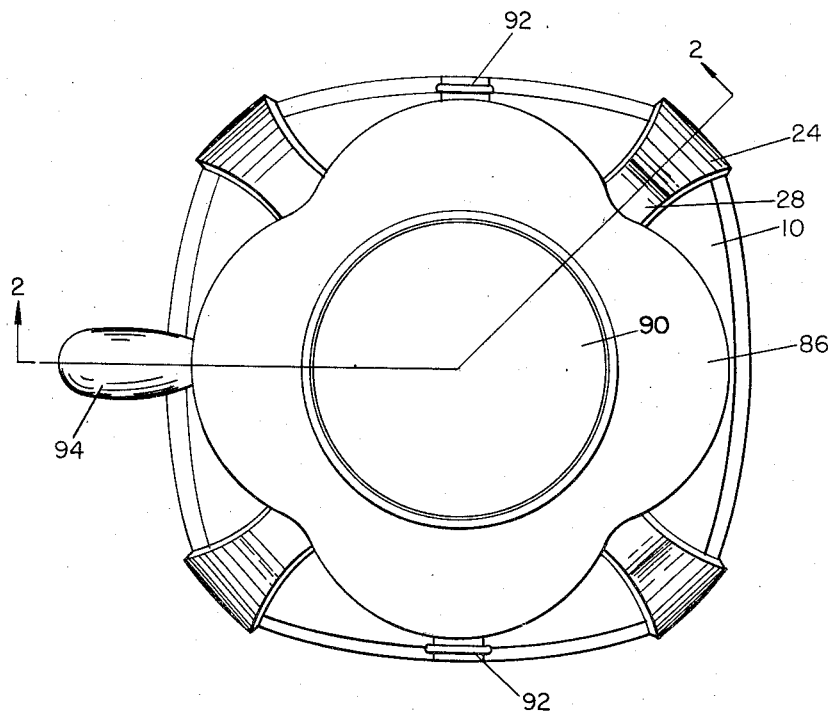

Nov. 25, 1958     A. C. DE ANGELIS     2,861,785
BLENDER FOR MATERIALS

Filed March 11, 1955     2 Sheets-Sheet 1

INVENTOR.
ANGELO C. DE ANGELIS
BY
ATTORNEY

United States Patent Office 2,861,785
Patented Nov. 25, 1958

2,861,785

BLENDER FOR MATERIALS

Angelo C. De Angelis, Fair Haven, N. J., assignor, by mesne assignments, to Dynamics Corporation of America, New York, N. Y., a corporation of New York Application March 11, 1955, Serial No. 493,625

1 Claim. (Cl. 259—108)

The present invention relates to improvements in blenders or devices for comminuting or disintegrating solid materials and/or thoroughly mixing or blending liquid materials.

A principal object of the invention is to provide a blender of relatively large capacity as compared with the more commonly known household kitchen or drink blending appliances and which is adapted, primarily but not exclusively, for commercial or voluminous uses such as in restaurants, laboratories, industrial plants or the like.

Another principal object is to provide a blender of the heavy duty type which is adapted for the treatment of a great variety of solid and liquid or fluent materials.

More specific objects of the invention are to provide an improved base construction whereby the motor drive shaft is accurately held axially of the base and whereby the blender container rotor is accurately positioned in axial alignment with the motor drive shaft; an improved blender container and rotor assembly; improved driving connecting means between the motor drive shaft and container rotor whereby to minimize damage in the event the rotor becomes overloaded or jammed; and a blender container and base assembly which in general is extremely durable, simple in manner of construction and relatively inexpensive in cost of manufacture and assembly of parts.

Other and further objects and advantages will be apparent from the following detailed description taken in conjunction with the accompanying drawings wherein a preferred embodiment of the principles of the invention has been selected for exemplification.

Figure 2:
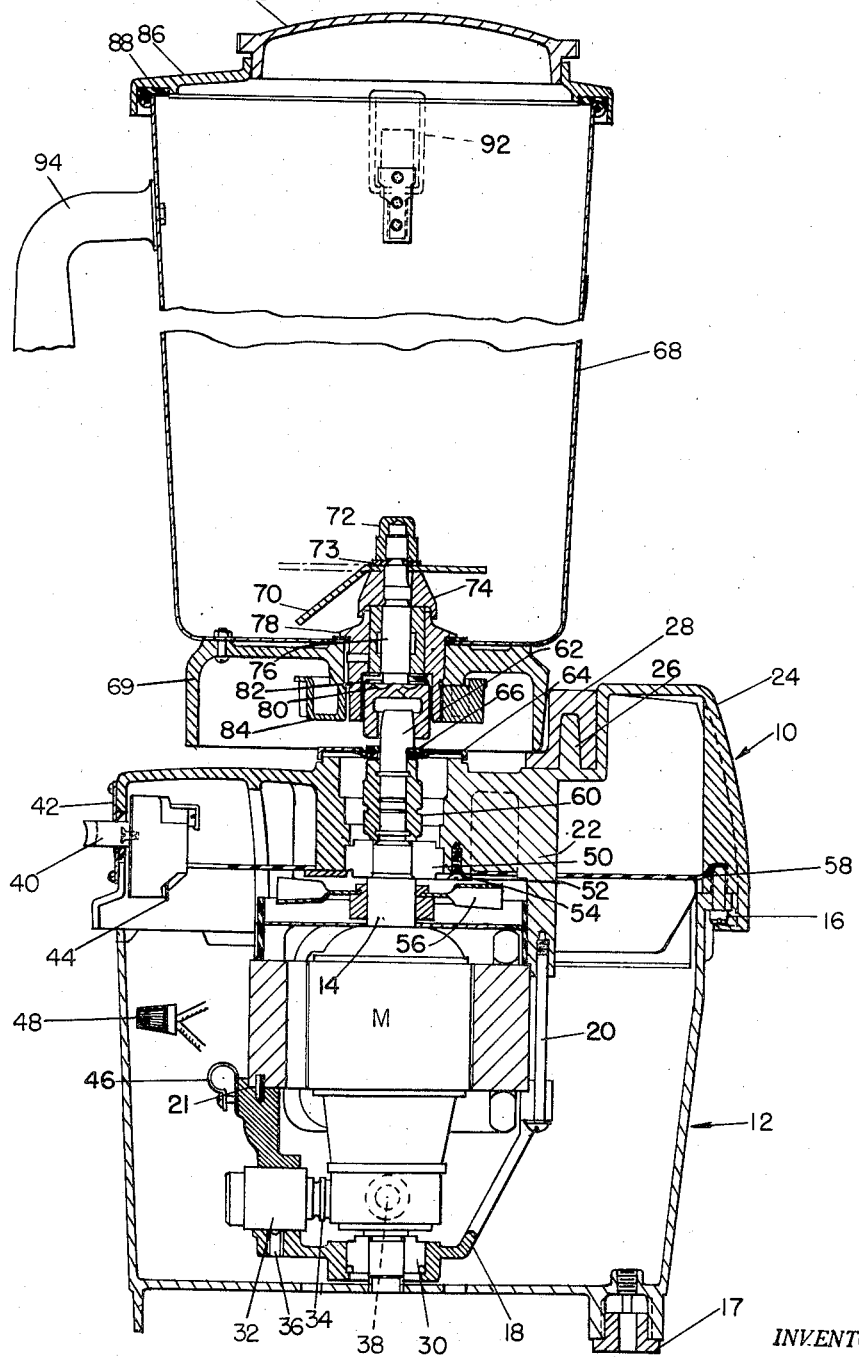

In the drawings:

Fig. 1 is a plan view of a blender constructed in accordance with a preferred embodiment of the present invention; and Fig. 2 is a vertical sectional view taken on the line 2—2 of Fig. 1 and looking in the direction of the arrows.

Referring more particularly to the drawings, wherein like numerals refer to like parts, top and bottom shell members 10 and 12, respectively, are provided to enclose a suitable electric motor designated at M and having a drive shaft 14. As shown, the annular skirt portion of the top shell 10 may be spaced outwardly of the top portion of the bottom shell to provide space for the circulation of air and the members may be joined together by peripherally spaced screws 16 to form the blender base. A plurality of spaced feet 17 may be secured to the bottom shell 12 to provide a base support.

A lower housing 18 is provided for the motor M which may be positioned therein by dowels 21 and the lower housing is secured by elongated screws 20 to the top shell member 10, the inner central portion 22 of which forms a top housing for the motor M. The upper portion of the top shell 10 is provided with integral annularly spaced shoulders 24 and upright fingers 26 which support holder pads 28 for accurately positioning the blender jar, hereinafter described, in axial alignment with the motor drive shaft 14. The lower motor housing 18 is recessed to receive a bearing 30 for the lower end of the rotor or shaft 14 and provides a support for a holder 32 for a brush 34, the holder being secured by the set screw 36, and also a support for a strain relief bushing 38.

Suitable controls for the motor M preferably take the form of multispeed switches having push buttons or the like 40, a switch plate 42 and including terminals 44, wire clip 46 and a solderless connector 48.

The upper end of the motor shaft 14 rides in a bearing 50 positioned in the inner central portion 22 of the top shell member 10 by a retainer plate 52 and connecting screws 54. A fan 56 to induce the circulation of cooling air around the motor M is keyed or otherwise suitably secured to an upper end portion of the shaft 14 and baffle means 58 extends transversely of the top shell interior to maintain such air flow in the desired vicinity of the motor. A coupling member 60 connects the upper extremity of the shaft 14 to a drive stud 62 which projects centrally upwardly through the top shell 10, through the slinger 64 and washer means 66. The stud 62 is designed for driving engagement with the jar rotor now to be described.

The jar or container indicated at 68 for holding material to be blended may be constructed of stainless steel or any other suitable material and is preferably formed in a clover-leaf transverse sectional configuration or other construction to divide the material into a plurality of intersecting columns. A depending jar support 69 is riveted or otherwise suitably secured to the bottom of the jar 68 to provide a base for engaging the holder pads 28 whereby to position the jar axially of the motor driving stud 62. A suitable rotor or blade structure 70, preferably similar to that shown in co-pending application Serial No. 466,278, filed November 2, 1954, now U. S. Patent 2,788,038, is rotatably supported axially and slightly upwardly of the bottom of the container 68 to comminute solids and thoroughly to mix or blend the contents. The blade or rotor 70 is secured by a cap nut 72, tightening washer 73 and bearing cap 74 to a splined drive shaft 76 held axially of a bearing assembly 78 and tensioned by a loading spring 80 and washer 82. The bearing assembly, rotor and rotor drive shaft are secured together to the jar 68 and to the jar support 69 by a lock nut 84 preferably provided with a serrated periphery for ready manipulation.

A suitable cover 86 may be provided for the jar or container 68, preferably equipped with an annular gasket 88 for close fit against the upper lips of the container side walls and, if desired, with a removable cap 90. For securing the cover 86 to the container suitable latch means 92 may be provided such as shown. A handle 94 is also desirably provided for the container.

The uses and operation of blenders in general are believed to be well known. The particular advantages of the blender of the present invention reside in its sturdy and simple construction which enables the use of a container of much larger capacity than heretofore and the comminuting or blending of materials in much larger quantities than heretofore such as to adapt the device for various industrial, laboratory and restaurant uses as distinguished from the mere household kitchen and drink mixing appliance field. The multi-speed switches provide for selected regulated speeds best suited for treatment of a great variety of solid and fluid materials and various mixtures thereof. The novel driving connection between the motor drive shaft and the container rotor protects the operating parts of the device from damage should the rotor become overloaded or jammed and greatly lengthens the operating life of the motor and other parts. The removable cap 90 enables the user to observe or to add materials during the blending operation without the necessity of shutting off the motor. A structural feature which the invention embraces and which is of very particular importance is the arrangement of the base top shell 10 to form the upper housing of the motor and the container positioning means carried by the top shell which insures at all times the accurate positioning of the container rotor in axial alignment with the motor drive shaft.

It will be understood, however, that the present invention is not confined to the precise construction and arrangement of parts herein illustrated and described but embraces all such modified forms thereof as come within the scope of the following claim.

I claim:

A heavy duty blender comprising a base, said base having a bottom shell and an upper shell supported on and separably secured to said bottom shell for substantially enclosing said base, said upper shell being integrally formed with annularly disposed upwardly projecting shoulders and a central opening surrounded by an integral annular downwardly projecting flange, an axial bearing secured in said central opening, an electric motor having a stator frame and a rotor with a shaft journaled in a lower bearing supported by said frame, means for suspending said frame from said flange with the axial alignment of said rotor shaft fixed by journaling said rotor shaft in said axial bearing, a blending container having a blending rotor element journaled in the bottom wall of said container, means on the outside lower portion of said container cooperating with said shoulders for supporting and positioning said container on said upper shell with the rotative axis of said blending rotor element aligned with the axis of said shaft, and a driving connection between said shaft and said blending rotor element when said container is positioned on said upper shell.

References Cited in the file of this patent

UNITED STATES PATENTS

| | | |
|---|---|---|
| 1,141,358 | Portmann | June 1, 1915 |
| 1,332,019 | Allison | Feb. 24, 1920 |
| 1,529,830 | Blish et al. | Mar. 17, 1925 |
| 2,109,501 | Osius | Mar. 1, 1938 |
| 2,284,155 | Landgraf | May 26, 1942 |
| 2,304,476 | Poplawski | Dec. 8, 1942 |
| 2,352,232 | Strauss | Jan. 27, 1944 |
| 2,664,002 | Anderson | Dec. 29, 1953 |
| 2,692,854 | Henley | Oct. 26, 1954 |
| 2,720,329 | Kochner | Oct. 11, 1955 |
| 2,740,029 | Kueser et al. | Mar. 27, 1956 |
| 2,755,900 | Seyfried | July 24, 1956 |
| 2,788,038 | Corcoran | Apr. 9, 1957 |

FOREIGN PATENTS

| | | |
|---|---|---|
| 136,134 | Sweden | Oct. 11, 1949 |